Aug. 31, 1926.  
C. W. SPICER  
1,598,543  
METHOD AND APPARATUS FOR OBTAINING A RUNNING BALANCE  
Filed July 5, 1924
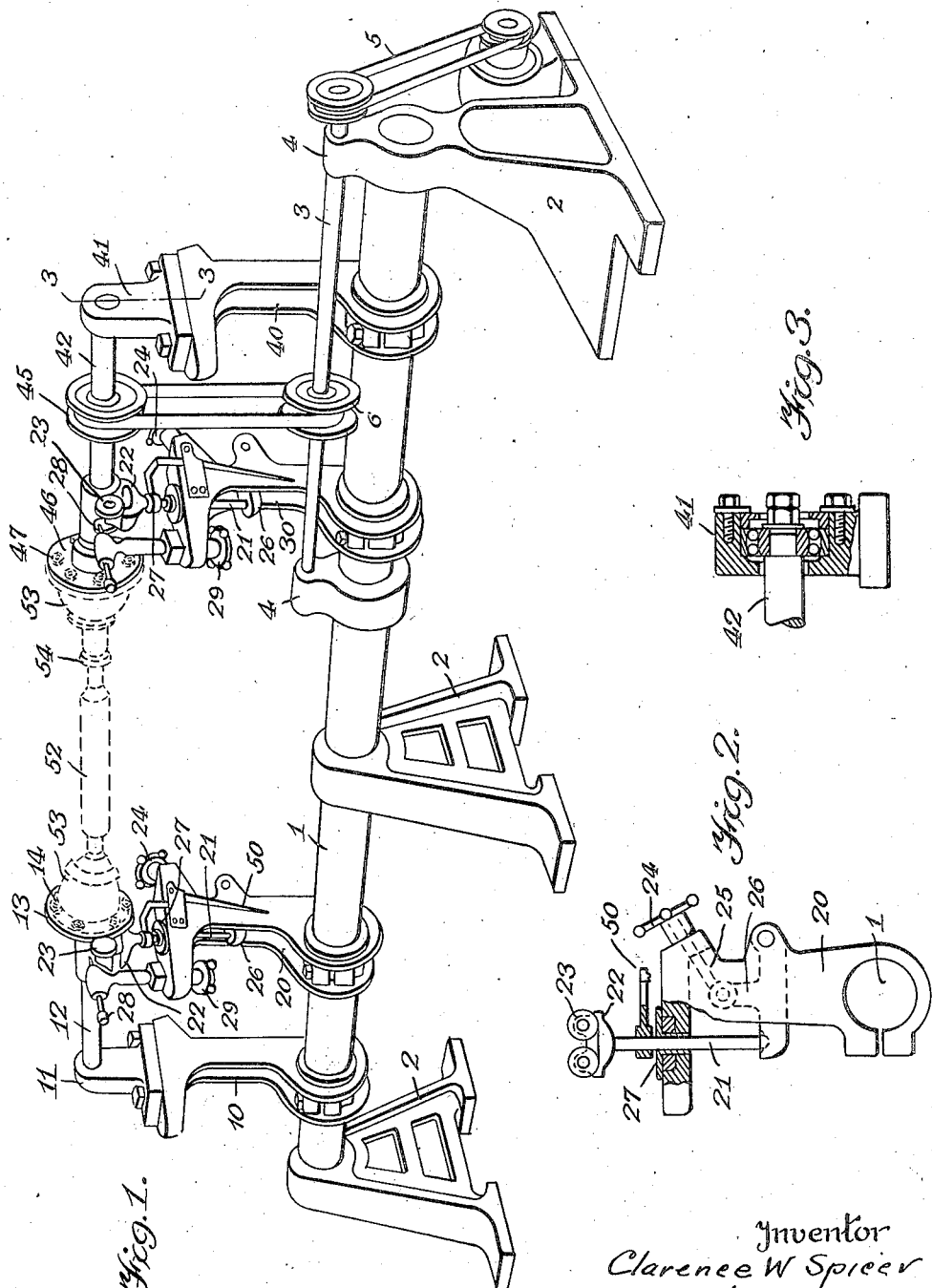
Inventor  
Clarence W Spicer  
by  
his Attorney Patented Aug. 31, 1926.

1,598,543

UNITED STATES PATENT OFFICE.

CLARENCE WINFRED SPICER, OF PLAINFIELD, NEW JERSEY, ASSIGNOR TO SPICER MANUFACTURING CORPORATION, A CORPORATION OF VIRGINIA.

METHOD AND APPARATUS FOR OBTAINING A RUNNING BALANCE.

Application filed July 5, 1924. Serial No. 724,420.

My invention relates to improvements in methods of and apparatus for obtaining a running balance in hollow shafts, more particularly to that type of shaft classed as a propeller shaft which is usually provided with a universal joint on each end.

In methods of balancing heretofore used the piece to be balanced is first put in static balance then the piece is rotated and the centrifugal couple and the plane of unbalance are determined and metal is added or subtracted to bring the piece into a dynamic balance. While this method is highly satisfactory for solid shafts and pieces, many difficulties arise when the shaft is built up of tubing and sheet metal such as the propeller shafts used on automobiles. One of the objects of this invention is to provide a method which will overcome these difficulties. In my method the centrifugal couple is counteracted by bending the shaft in the plane of unbalance.

Another object of this invention is to provide a simple machine that will locate the plane of unbalance, so that the part may be bent to compensate, and thereby remove, the resultant centrifugal couple.

Another object is to provide a machine on which a hollow shaft provided with universal joints on each end may be tested for balance.

The foregoing and other features of my invention will now be described in connection with the accompanying drawing in which I have represented my apparatus in its preferred form, after which I shall point out more particularly in the claims those features which I believe to be new and of my own invention.

In the drawings:

Figure 1 is an isometric view of my apparatus employed.

Figure 2 is a side view of upright 20 in part section.

Figure 3 is a sectional detail of my self-aligning bearing, along the lines 3, 3 Figure 1.

In carrying out my invention I provide four uprights 10, 20, 30 and 40 all mounted for adjustment on a rigid supporting member 1 which is in turn mounted on supports 2. A counter shaft 3 is mounted in suitable bearings 4 and receives its motion from a source of power 5. A pulley 6 is adjustably mounted on the counter shaft 3 so that it may be secured to the shaft 3 at any point between the bearings 4.

On the upright 10, I provide a self-aligning bearing 11 in which a spindle 12 is mounted so that it cannot come out of the bearing. On the opposite end of the spindle I provide a taper or other means of securing a flange 13 to the spindle. This spindle rests upon an oscillating shaft support 21 of any well known design. The shaft support is adapted to oscillate without damping transversely to the initial axis of the spindles 12 and 42. The bearing illustrated while well known to the art comprises an inverted pendulum 22 having rolls 23 mounted on the top thereof on which the spindle 12 is supported. The height of the oscillating bearing may be varied by means of the hand wheel 24, adjusting screw 25 and lever 26 to thereby adjust the periodicity of free lateral oscillation of the bearing to bring the same in resonance or synchronism with the vibrating of the body under examination. The support 21 passes through a rubber pad or bushing 27. Slidably mounted on the upright 20 is the kiel 28 which when brought into contact with the spindle may mark the surface of the spindles 12 and 42 when prepared for the purpose. The height of the kiel 28 may be adjusted by the adjustment 29. A needle 50 which is attached to the inverted pendulum 22 magnifies the oscillations.

Upon the upright 30 a similar oscillating bearing is provided to support the spindle 42. On the upright 40, I provide a self-aligning bearing 41 into which a spindle 42 is mounted and held therein in its revolving position. The self-aligning bearing is shown in detail in Figure 3. It will be readily seen that its construction prevents the withdrawal of the spindle from bearing but does not in the slightest degree affect its universal movement therein. A pulley 45 is mounted on the spindle 42 and belted to pulley 6 on the countershaft 3. The spindle is supported on the oscillating support mounted in upright 30—all as hereinbefore described. On the end of the spindle 42, I provide means for securing a flange 46 such as a taper or the like. Between the flanges 46 and 13 is bolted a universal drive shaft as shown which embodies two universal joints, a hollow shaft and slip spline to be tested.

When the propeller shaft 52 shown on the drawing in dotted lines is bolted in place the test may be run as follows:—

Power is turned on and the machine brought up to the desired speed. The spindles are inked and the kiel 28 is lightly held against the surface in several places. The shaft is then brought to rest and the kiel marks are examined carefully, the average is taken and a line drawn through the center. The shaft is then rotated in the opposite direction and the piece marked with the kiel. It will be found that the resultant of these marks will be in a different location than the first set because of the lag due to the elasticity, momentum and friction of the parts which are in vibration. The heavy spot is half way between these two resultant marks.

As this method of test is well known in the art no further description is necessary here. It is sufficient to say that the plane of unbalance is thus found and the piece bent to compensate for the centrifugal couple, and again tested until a running balance is obtained.

I have illustrated a well known type of propeller shaft of design commonly used on automobiles secured in place for test for balance. The hollow shaft 52 is provided with standard type universal joints 53 on each end and a slip spline 54.

I wish it distinctly understood that my method and apparatus herein described is in the form in which I desire to use it but that changes or variations may be made as may be convenient or desirable without departing from the salient features of my invention and I, therefore, intend the following claims to cover such modifications as naturally fall within the lines of invention:

1. The method of balancing a normally straight hollow shaft which consists in testing said part for balance and if found out of balance bending it crooked to remove the centrifugal couple.

2. The method of balancing an unbalanced piece which consists in compensating the centrifugal couple by bending the piece crooked in the plane of unbalance.

3. The method of balancing which consists in testing the piece so as to locate the plane of unbalance and compensating by bending the piece crooked in the plane of unbalance.

4. In a machine for testing balance, in combination two oscillating shaft supports; two self aligning bearings; two spindles each adapted to carry on one end a flange, the opposite end mounted in self-aligning bearings and adapted to rest upon the oscillating shaft supports.

5. In a machine for testing balance, in combination a supporting bar, two oscillating shaft supports mounted for adjustment on the supporting bar, two supports provided with self aligning bearings mounted on the supporting bar outside the oscillating shaft supports, a spindle mounted in one of the self-aligning bearings and supported by one of the shaft supports and provided with means to be revolved in either direction, a second spindle mounted in the other self-aligning bearing and supported by the oscillating shaft support, both spindles provided with flanges adapted to receive the piece to be tested for balance.

6. In a machine for testing balance in combination two oscillating shaft supports and two supports carrying self-aligning bearings mounted on a supporting bar, two spindles one end of each adapted to be mounted in the self-aligning bearings and be supported by the oscillating shaft supports.

7. In a machine for testing balance, in combination a base support, two oscillating shaft supports mounted for adjustment thereto, two self aligning bearings mounted on the base support, a spindle mounted in one of the self aligning bearings and supported by one of the shaft supports and provided with means to be revolved in either direction, a second spindle mounted in the other self aligning bearing and supported by the other oscillating shaft support, both spindles adapted to receive and support a piece to be tested for balance.

In testimony whereof I affix my signature.

CLARENCE WINFRED SPICER.